(12) United States Patent
Ito (10) Patent No.: US 9,621,866 B2
(45) Date of Patent: Apr. 11, 2017

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Hidenori Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 14/203,319

(22) Filed: Mar. 10, 2014

(65) Prior Publication Data

US 2014/0193135 A1 Jul. 10, 2014

Related U.S. Application Data

(63) Continuation of application No. 12/612,937, filed on Nov. 5, 2009, now Pat. No. 8,713,472.

(30) Foreign Application Priority Data

Nov. 21, 2008 (JP) .................................. 2008-298654

(51) Int. Cl.
| | |
|---|---|
| *G06F 3/048* | (2013.01) |
| *H04N 9/87* | (2006.01) |
| *H04N 7/16* | (2011.01) |
| *H04N 21/431* | (2011.01) |
| *H04N 21/438* | (2011.01) |
| *H04N 21/4402* | (2011.01) |
| *H04N 21/482* | (2011.01) |

(52) U.S. Cl.
CPC .............. *H04N 9/87* (2013.01); *H04N 7/163* (2013.01); *H04N 21/4312* (2013.01); *H04N 21/4314* (2013.01); *H04N 21/4384* (2013.01); *H04N 21/440263* (2013.01); *H04N 21/482* (2013.01); *G06F 3/048* (2013.01)

(58) Field of Classification Search
CPC ...................................................... G06F 3/048
USPC ........................................................ 715/787
See application file for complete search history.

(56) References Cited

U.S. PATENT DOCUMENTS

| | | | |
|---|---|---|---|
| 7,418,671 B2 | 8/2008 | Hama et al. | |
| 7,675,514 B2 | 3/2010 | Ni et al. | |
| 7,865,899 B2 | 1/2011 | Kawamoto et al. | |
| 8,022,970 B2 | 9/2011 | Odagawa | |
| 8,196,043 B2 * | 6/2012 | Crow ...................... | G06F 3/048 715/716 |
| 2002/0054132 A1 | 5/2002 | Meier et al. | |
| 2005/0081164 A1 | 4/2005 | Hama et al. | |

(Continued)

FOREIGN PATENT DOCUMENTS

| | | |
|---|---|---|
| JP | 07-036437 A | 2/1995 |
| JP | 2006-66944 A | 3/2006 |

(Continued)

*Primary Examiner* — William Titcomb
(74) *Attorney, Agent, or Firm* — Canon USA, Inc. I.P. Division (57) ABSTRACT

An image processing apparatus includes a display control unit configured to scroll a plurality of pieces of content data, a prediction unit configured to predict which content data among the plurality of pieces of content data moves from a hidden area to a display area according to a scroll display control condition controlled by the display control unit, and a decoding unit configured to decode the content data predicted by the prediction unit before the predicted content data moves to the display area.

16 Claims, 8 Drawing Sheets

(56) References Cited

U.S. PATENT DOCUMENTS

| | | | |
|---|---|---|---|
| 2006/0045475 A1 | 3/2006 | Watanabe | |
| 2010/0229088 A1* | 9/2010 | Nakajima | G06F 3/048 715/702 |
| 2014/0033099 A1* | 1/2014 | Treitman | G06F 3/04855 715/768 |

FOREIGN PATENT DOCUMENTS

| | | |
|---|---|---|
| JP | 2009-518758 A | 5/2009 |
| WO | 2007/067858 A2 | 6/2007 |

* cited by examiner

| LAPSED TIME | ROTATION SPEED | ACCELERATION SPEED |
|---|---|---|
| 0 | 1/8 | 0 |
| 1 | 1/8 | 0 |
| 2 | 1/8 | -1/8 |
| 3 | 0 | -1/8 |
| 4 | -1/8 | 0 |
| 5 | -1/8 | 0 |

| LAPSED TIME | CONTENT NUMBER | | | | | | | |
|---|---|---|---|---|---|---|---|---|
| | 1 | 2 | 3 | 4 | 5 | 6 | 7 | 8 |
| 0~1 | 1.0 | 1.0 | 1.0 | 1.0 | 0.25 | — | — | — |
| 1~2 | — | 1.0 | 1.0 | 1.0 | 0.75 | 0.5 | — | — |
| 2~3 | — | 0.375 | 1.0 | 1.0 | 1.0 | 0.5 | 0.375 | — |
| 3~4 | — | — | 0.625 | 1.0 | 1.0 | 1.0 | 0.625 | — |
| 4~5 | — | — | 0.25 | 1.0 | 1.0 | 1.0 | 1.0 | — |
| 5~6 | 0.5 | 0.625 | 0.125 | 1.0 | 1.0 | 1.0 | — | — |

IMAGE PROCESSING APPARATUS, IMAGE PROCESSING METHOD, AND PROGRAM

CROSS REFERENCE TO RELATED APPLICATIONS

The present application is a continuation of U.S. patent application Ser. No. 12/612,937, filed Nov. 5, 2009, entitled "IMAGING PROCESSING APPARATUS, IMAGE PROCESSING METHOD, AND PROGRAM", the content of which is expressly incorporated by reference herein in its entirety. Further, the present application claims the benefit of priority from Japanese Patent Application No. 2008-298654, filed Nov. 21, 2008, which is also hereby incorporated by reference herein in its entirety.

BACKGROUND OF THE INVENTION

Field of the Invention

The present invention relates to a technique to perform scroll display of a plurality of pieces of content data.

Description of the Related Art

Recently, a playback of video contents received through a network or stored in a storage unit in high volume has been becoming a typical technique according to a development of a high-speed network and an expansion of a capacity of the storage unit such as a hard disk drive. According to the above technique, the plurality of video contents are replayed and displayed on a screen while the video contents are scrolled on the display screen.

When the plurality of video contents are displayed on the display screen at once, according to the conventional method, an input from a user is received, a video content to be displayed next is determined, the determined video content is subjected to decoding processing, and the decoded video content is displayed on the screen, in this order. However, since the video content to be displayed is subjected to the decoding processing after the video content to be displayed is determined, such a problem arises that a delay occurs between a time at which the video content to be displayed is determined and a time at which the video content is actually displayed on the screen.

To resolve the above problem, for example, Japanese Patent Laid-Open Publication No. 2006-66944 discusses a method by which data which has a high possibility to be output next, is preliminarily held in a cache memory when a plurality of video contents or thumbnail images of the video contents are subjected to a multi-image display on the screen. By the technique, the data presently being output as well as the data within a predetermined range preceding and subsequent to the data presently being output is converted into output images and held as the converted images as much as the capacity of the cache memory allows depending on a file management structure.

However, in the technique discussed in Japanese Patent Laid-Open Publication No. 2006-66944, it is not possible to predict and prepare the data, which has a high possibility to be output next, when a plurality of arbitrary video contents are subjected to the multi-image display independent from the file management structure. Further, in the above described technique, it is not possible to predict or prepare the data, which has a high possibility to be output next, according to a moving condition of the screen when the video contents are subjected to the multi-image display.

SUMMARY OF THE INVENTION

The present invention is directed to predicting content data, which has a high possibility to be displayed next according to a control condition of scroll display and decoding the predicted content data before the predicted content data is displayed.

According to an aspect of the present invention, an image processing apparatus includes a display control unit configured to scroll a plurality of pieces of content data, a prediction unit configured to predict which content data among the plurality of pieces of content data moves from a hidden area to a display area according to a scroll display control condition controlled by the display control unit, and a decoding unit configured to decode the content data predicted by the prediction unit before the predicted content data moves to the display area.

According to the present invention, the content data which moves from a hidden area to a display area is predicted according to a scroll display control condition of a plurality of pieces of content data and the predicted content data is decoded before the predicted content data moves to the display area. Therefore, according to the present exemplary embodiment, it is possible to predict the content data, which has a high possibility to be displayed next according to the scroll display control condition, and decode the predicted content data before the predicted content data is displayed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
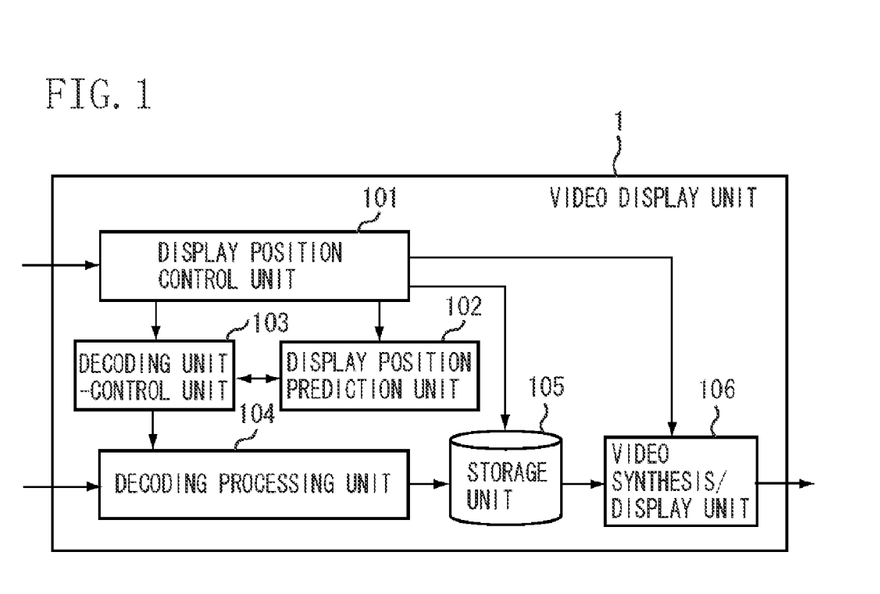
FIG. 1 is a block diagram illustrating a configuration of a main part of a video display unit according to an exemplary embodiment of the present invention.

FIG. 1 is a block diagram illustrating a configuration of a main part of a video display unit according to an exemplary embodiment of the present invention. In FIG. 1, a video display unit 1 receives a display image operation notification in a display position control unit 101, receives a video content in a decoding processing unit 104, and outputs the video content to a display device from a video synthesis/display unit 106. The video display unit 1 has a configuration corresponding to an application example of the image processing apparatus of the present invention. The video content has a configuration corresponding to an application example of the content data of the present invention.

The display position control unit 101 receives a content display position operation input from a user through a remote control, a portable terminal or the like and video content information input into the video display unit 1, and controls locations, positions, and a traveling speed of the video contents to be subjected to a scroll display. The display position control unit 101 issues to a storage unit 105 an instruction to output the video contents to be displayed on the display screen of the display device, and provides location information about the video contents to be displayed on the screen, to a video synthesis/display unit 106. The display position control unit 101 has a configuration corresponding to an application example of the display control unit of the present invention.

A display position prediction unit 102 receives from the display position control unit 101 the total number of video contents arranged into an annular ring shape and a rotation speed and an acceleration speed of a scroll display. Further, the display position prediction unit 102 receives from a decoding unit-control unit 103 an extra amount of decoder. The display position prediction unit 102 calculates a resource allocation ratio of the decoding processing unit 104 with respect to hidden (not displayed) video contents and provides to the decoding unit-control unit 103 with the resource allocation ratio of the decoding processing unit 104 with respect to the hidden video contents. The display position prediction unit 102 has a configuration corresponding to an application example of the prediction unit of the present invention.

The decoding unit-control unit 103 receives locating position information of the video contents arranged into the annular ring shape and video content information presently displayed on the display screen from the display position control unit 101. Then, the decoding unit-control unit 103 calculates a decoding resource amount to be preferentially allocated to the video contents in the display area and provides the display position prediction unit 102 with an extra amount of decoder. Subsequently, the decoding unit-control unit 103 receives from the display position prediction unit 102 the resource allocation ratio of the decoding processing unit 104 with respect to the presently hidden video contents. The decoding unit-control unit 103 provides the decoding processing unit 104 with video content information to be subjected to decoding processing and a time allocation of the decoding processing resource of the decoding processing unit 104 with respect to each of the video contents.

The decoding processing unit 104 receives video contents through a network interface (I/F). An example of a communication line to be connected through the network I/F includes a broadband network such as a telephone line, a digital subscribe line (DSL) of a public network line, a cable television (CATV) and an optical fiber. Further, the video contents may be input from the storage unit such as a hard disk drive (HDD) recorder and an internal memory. The decoding processing unit 104 decodes each of the decode target video contents based on the video content information received from the decoding unit-control unit 103 and the time allocation of the decoding processing resource, and stores the decoded video contents in the storage unit 105. The decoding processing unit 104 has a configuration corresponding to an application example of a decoding unit of the present invention.

The storage unit 105 holds the decoded video contents received from the decoding processing unit 104, and outputs the decoded video contents to the video synthesis/display unit 106 in response to an instruction received from the display position control unit 101.

The video synthesis/display unit 106 combines the decoded video contents received from the storage unit 105 with each other on the same screen based on the location information of the video contents on the display screen received from the display position control unit 101, and outputs the combined video contents to a display device such as a liquid crystal display.

Figure 2:
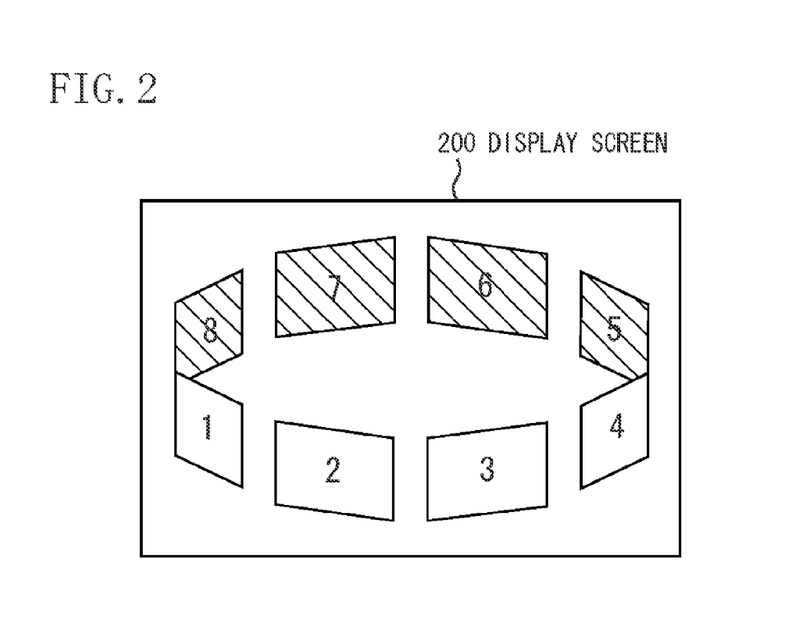
FIG. 2 illustrates examples of video contents output onto a display screen of a display device.

FIG. 2 illustrates an example of the video contents to be output to a display screen 200 of the display device.

Objects 1 through 8 shown in the display screen 200 are windows displaying the different video contents, respectively. The windows (1 through 4) in a front side of the display screen 200 show obverse sides on which the video contents are displayed. The windows (5 through 8) in a rear side of the display screen 200 show reverse sides on which the video contents are not displayed.

The windows arranged into the annular ring shape show movements of rotation and acceleration and stop of the rotation when a user inputs an operation. When the video content changes its state from the reverse side to the obverse side to be shown according to the rotation, the window displays the video content. On the other hand, when the video content changes its state from the obverse side to the reverse side to be shown, the video content displayed on the window is no longer displayed. A location and a movement of the video content are controlled by the display position control unit 101 of FIG. 1.

Figure 3:
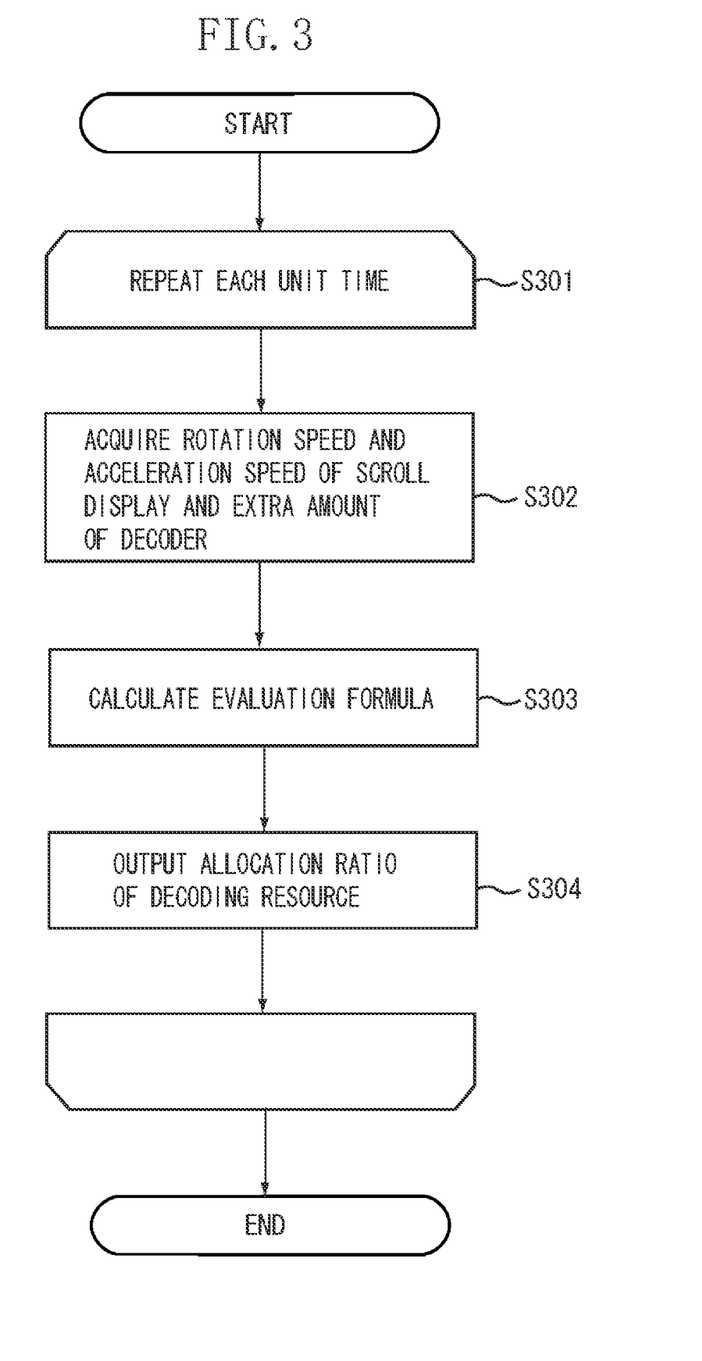
FIG. 3 is a flow chart illustrating an operation of a display position prediction unit of the video display unit shown in FIG. 1.

FIG. 3 is a flow chart illustrating an operation of the display position prediction unit 102 of the video display unit 1 shown in FIG. 1. The operation of the display position prediction unit 102 will be described below with reference to FIG. 3.

Step S301 shows processing of the following steps S302, S303 and S304 are repeated for every unit time. The unit time is a predetermined time period for a unit of processing that a designer can set to an arbitrary value. In the present exemplary embodiment, one second corresponds to one unit time.

In step S302, the display position prediction unit 102 acquires from the display position control unit 101 a rotation speed and an acceleration speed of the scroll. The display position prediction unit 102 also acquires from the decoding unit-control unit 103 an extra amount of decoder.

In step S303, the display position prediction unit 102 calculates an evaluation formula based on values of the rotation speed and the acceleration speed obtained in step S302. The evaluation formula shows a function of the rotation speed and the acceleration speed, which becomes an index for determining the allocation ratio of the decoding resource calculated in the following step S304. The evaluation formula used in the present exemplary embodiment is shown below as formula 1.

$$f(v, a) = v + k \cdot a \quad \text{Formula 1}$$

In the formula 1, "v" denotes the rotation speed obtained in step S302, "a" denotes the acceleration speed obtained in step S302, and "k" denotes a positive constant that is decided by a speed with which the user would like to make an evaluation after certain unit time has passed. More specifically, k=1 in the present exemplary embodiment. In other words, f (v, a) represents a speed after the "k" unit time.

In step S304, the display position prediction unit 102 uses the "f" calculated in step S303 to determine the allocation ratio of the decoding resource for the video contents which are not displayed.

Figure 4:
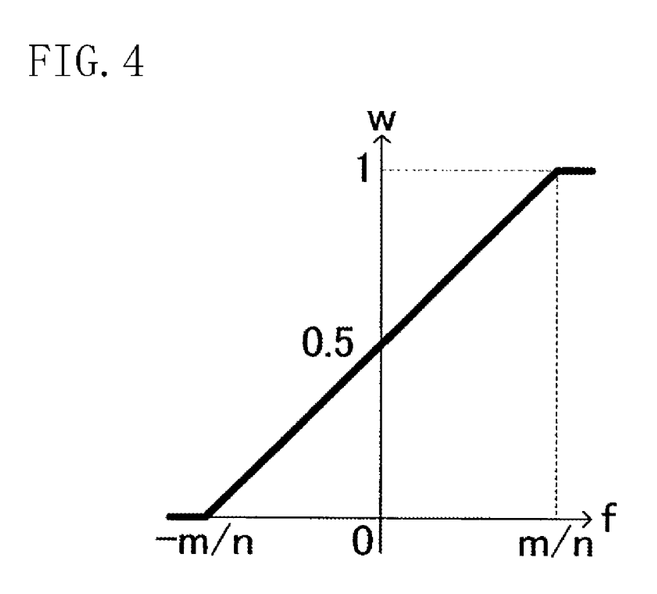
FIG. 4 illustrates a graph for determining an allocation ratio.
Figure 5:
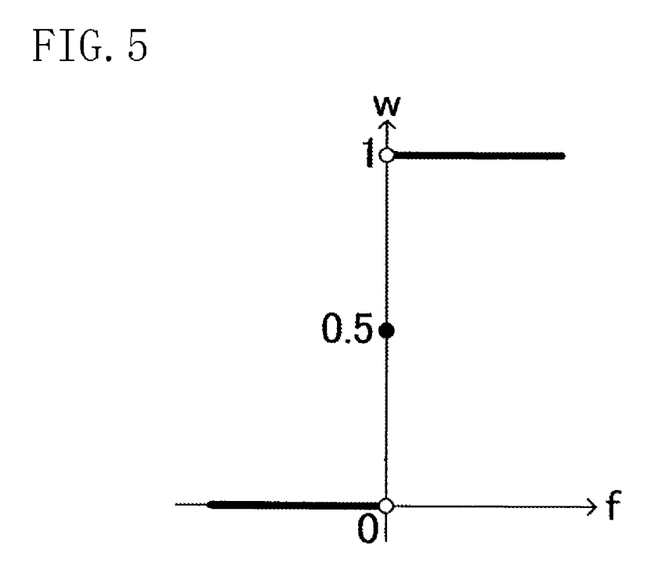
FIG. 5 illustrates another graph for determining the allocation ratio.

FIGS. 4 and 5 are graphs by which the allocation ratio used in the present exemplary embodiment is determined. "n" in FIG. 4 denotes the total number of the video contents arranged into the annular ring shape. "m" denotes the extra amount of decoder (processing time as a unit). "w" in FIGS. 4 and 5 denotes a ratio for allocating the resource to a video content in a direction coming into the display area from the hidden area (in a direction of a window 5 in the display screen 200 of FIG. 2) while the video contents arranged into the annular ring shape rotate in a clockwise direction. Which graph of FIG. 4 or 5 is used is determined by a formula 2.

$$g(v, a) = v \cdot a \quad \text{Formula 2}$$

In the formula 2, "v" denotes the rotation speed obtained in step S302 and "a" denotes the acceleration speed obtained in step S302. In the formula 2, if a value of "g" is equal to or less than 0, the rotation speed has a vector opposite to the acceleration speed. In this case, the graph of FIG. 4 is selected. In the graph of FIG. 4, it is predicted that both of the hidden video contents following the present rotation direction and the hidden video contents in the opposite rotation direction might come into the display area when the rotation speed and the acceleration speed have opposite vectors. If an absolute value of the "f" is smaller than "m/n", the decoding resource is allocated to the hidden video contents rotating in both directions.

Alternatively, in formula 2, if a value of the "g" is equal to or greater than 0, the rotation speed has the same vector as the acceleration speed, or either one of or both of the rotation speed and the acceleration speed has/have 0 value (s). In this case, the graph of FIG. 5 is selected. In the graph of FIG. 5, it is predicted to be highly possible that the hidden video contents following the present rotation direction might come into the display area in the future if the rotation speed has the same vector as the acceleration speed. According to the symbol of the "f" (future rotation direction), the decoding resource is allocated to the hidden video contents in one direction.

When the "g" is equal to or greater than 0 and "f=0", the decoding resource is allocated equally to the hidden video contents in both directions since both of the "v" and the "a" is 0. As described above, the display position prediction unit 102 determines the allocation ratio of the decoding resource to the video contents according to the prediction result about the video contents which move from the hidden area to the display area.

When the allocation ratio of the decoding resource is determined in the above described manner, the display position prediction unit 102 passes the allocation ratio to the decoding unit-control unit 103.

An operation of the video display unit 1 of the present exemplary embodiment will be described below with reference to specific numerical values. In the present exemplary embodiment, it is assumed that the decoding processing unit 104 has a capacity to decode the video content of 4.25 seconds per one second. The decoding processing unit 104 predecodes the video contents in the area of not displayed data. The maximum amount of decoded data to be stored in the storage unit 105 is that of the unit time (1 second in the present exemplary embodiment).

Figure 6:
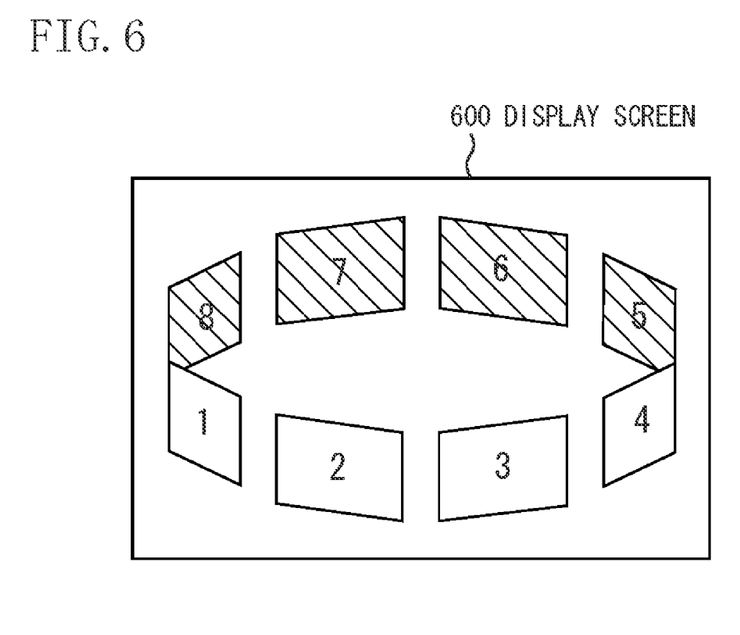
FIG. 6 illustrates an initial display state of a display screen.

FIG. 6 illustrates an initial display state of a display screen 600 according to the present exemplary embodiment. In the present exemplary embodiment, as an example case, 8 video contents are displayed so as to be formed into the annular ring shape and the 8 video contents are assigned with numbers 1 through 8, respectively.

Figure 7:
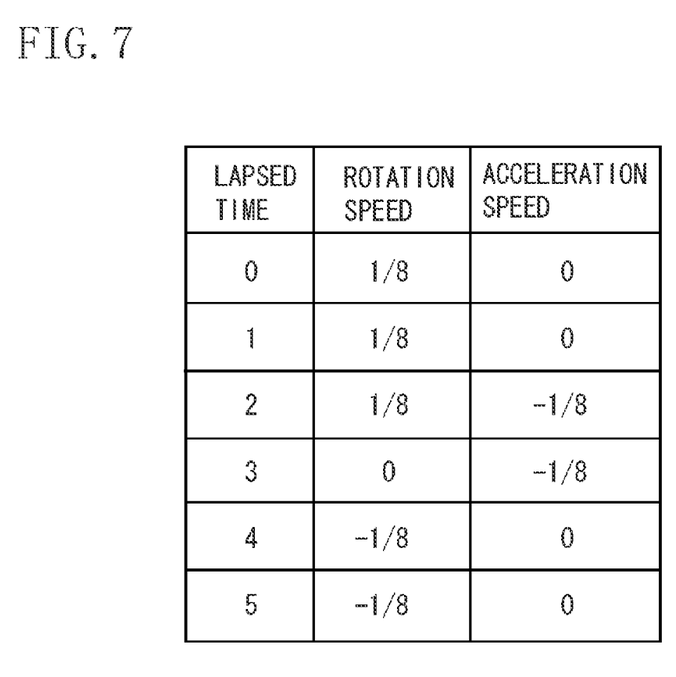
FIG. 7 illustrates a rotation speed and an acceleration speed of the video contents arranged into an annular ring shape, wherein positions of the video contents are determined by the display position control unit after 0 second to 5 seconds have elapsed.

FIG. 7 illustrates the rotation speed and the acceleration speed of each of the video contents arranged into the annular ring shape. Such values of the video contents are determined by the display position control unit 101 after 0 second to 5 seconds have elapsed. Those values are determined by the user inputting an operation instruction according to the display screen. A unit of the rotation speed is a number of rotations/sec., and a unit of the acceleration speed is a number of rotations/square of seconds. In both of the rotation speed and the acceleration speed, a positive direction is clockwise (a direction from a video content 2 toward a video content 1 in FIG. 6).

Figure 8:
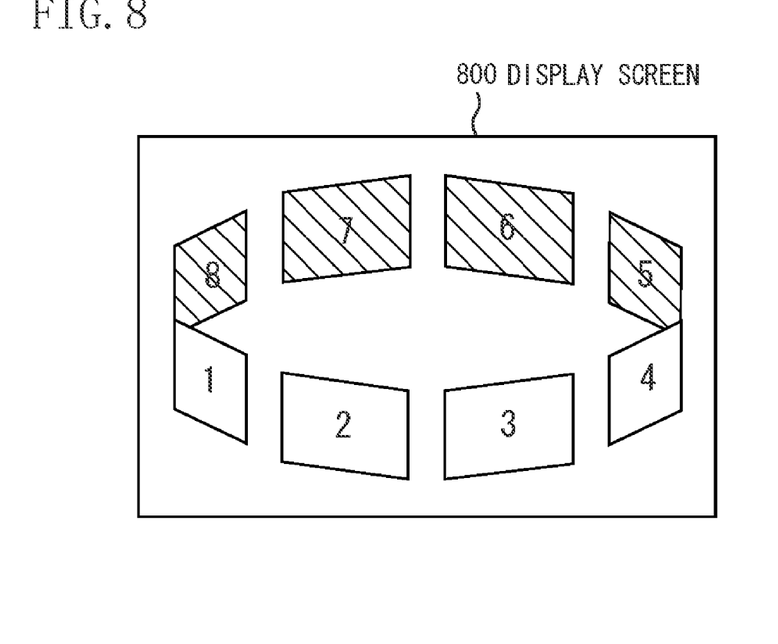
FIG. 8 illustrates a display state of a display screen 0 second after the video contents are displayed.

FIG. 8 illustrates a display state of a display screen 800, 0 second after starting the displayed. The operation of the video display unit 1 after 0 second to 1 second have elapsed will be described below.

The resource of the decoding processing unit 104 is preferentially allocated to the presently displayed screen (a video content 1, a video content 2, a video content 3 and a video content 4 in FIG. 8). In order to decode those vide contents for the period of unit time, the resource of 4 seconds of the decoding processing unit 104 is allocated. Consequently, the extra amount of decoder at the time will be 0.25.

Since the rotation speed and the acceleration speed 0 second after starting the display are ⅛ and 0 respectively in view of FIG. 7, the graph of FIG. 5 is selected according to the formula 2 and the "w" is 1 according to the formula 1 and FIG. 5. Therefore, the extra amount of decoder, i.e., 0.25, is allocated to the video content 5 of FIG. 8, and the video content 5 is decoded for 0.25 second in a time period after 0 second and before 1 second have elapsed.

The decoded data of the video content 1, the video content 2, the video content 3 and the video content 4 in the display area are passed from the storage unit 105 to the video synthesis/display unit 106 immediately after the decoded data are passed from the decoding processing unit 104 to the storage unit 105. In the video/synthesis display unit 106, the decoded data is subjected to video synthesis processing and thereafter output to the display device from the video synthesis/display unit 106. On the other hand, the decoded data of the video content 5 in the hidden area is passed from the decoding processing unit 104 to the storage unit 105 and held in the storage unit 105 until the video content 5 moves to the display area.

Figure 9:
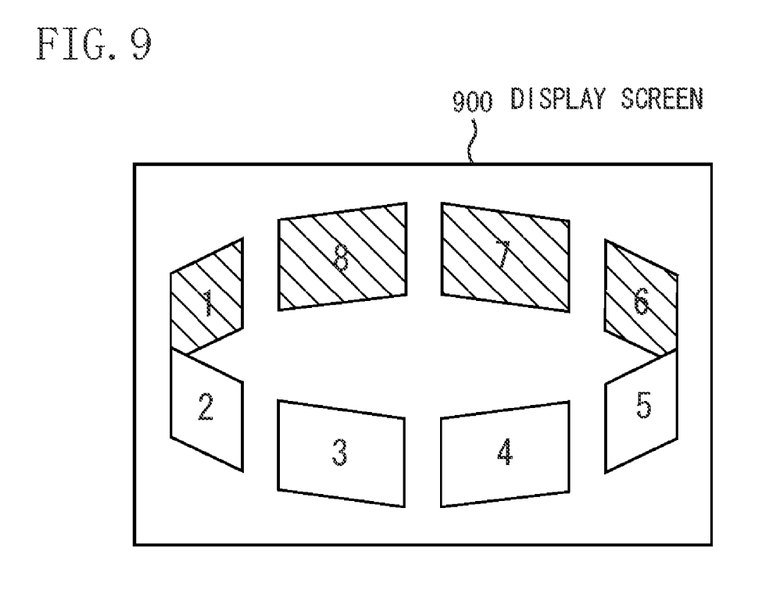
FIG. 9 illustrates a display state of a display screen 1 second after the video contents are displayed.

FIG. 9 illustrates a display state of a display screen 900, 1 second after starting the display. An operation of the video display unit 1 in a time period after 1 second and before 2 seconds have passed will be described below.

The resource of the decoding processing unit 104 is preferentially allocated to the presently displayed screen (i.e., a video content 2, a video content 3, a video content 4, and a video content 5 of FIG. 9). Since the video content 5 has already been decoded for 0.25 second after 0 second to 1 second have passed, the video content 5 needs to be further decoded for 0.75 second in order to display the video content 5 in a time period after 1 second and before 2 seconds have passed. Therefore, in order to decode the video content 2, the video content 3, video content 4 and the video content 5 for the period of unit time, the resource of 3.75 seconds of the decoding processing unit 104 is allocated. Accordingly, the extra amount of decoder becomes 0.5 at the time.

In view of FIG. 7, the rotation speed and the acceleration speed 1 second after starting the display, are ⅛ and 0 respectively. Therefore, the graph of FIG. 5 is selected according to the formula 2, such that the "w" is 1 according to the formula 1 and FIG. 5. Thus, the extra amount of decoder, i.e., 0.5, is allocated to a content 6 of FIG. 9, and thus the content 6 is decoded for 0.5 second in a time period after 1 second and before 2 seconds have elapsed.

Decoded data of the video content 2, the video content 3, the video content 4 and the video content 5 in the display area are passed from the storage unit 105 to the video synthesis/display unit 106 immediately after the above decoded data are passed from the decoding processing unit 104 to the storage unit 105. In the video synthesis/display unit 106, the decoding data is subjected to the video synthesis processing, and output from the video synthesis/display unit 106 to the display device. On the other hand, the decoded data of the video content 6 in the hidden area is passed from the decoding processing unit 104 to the storage unit 105, and held in the storage unit 105 until the video content 6 moves to the display area.

Figure 10:
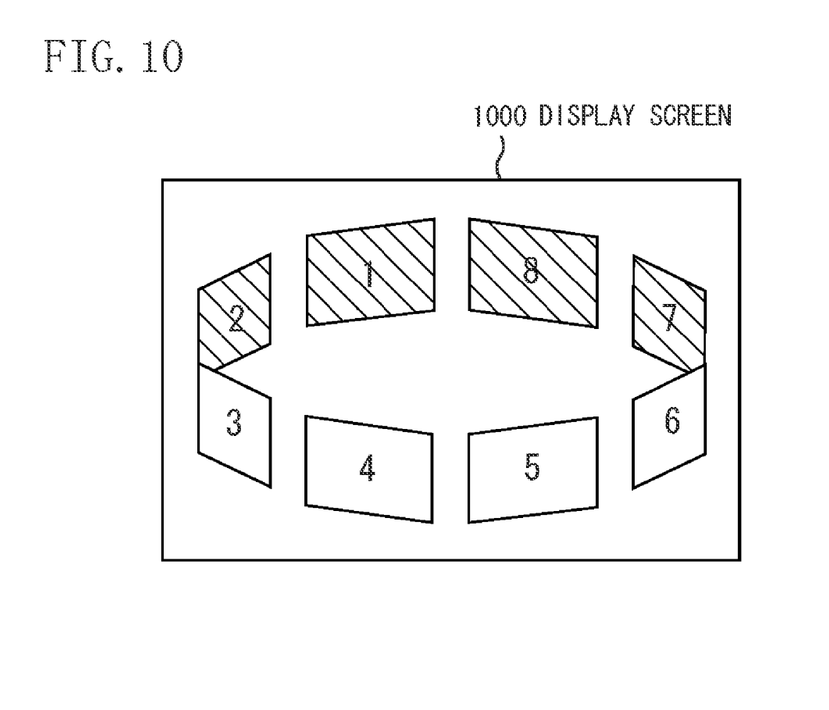
FIG. 10 illustrates a display state of a display screen 2 seconds after the video contents are displayed.

FIG. 10 illustrates a display state of a display screen 1000, 2 seconds after starting the display. An operation of the video display unit 1 in a time period after 2 seconds and before 3 seconds have elapse will be described below.

The resource of the decoding processing unit 104 is preferentially allocated to the presently displayed screen (i.e., a video content 3, a video content 4, a video content 5 and a video content 6 of FIG. 10). Since the video content 6 has already been decoded for 0.5 second in a time period after 1 second and before 2 seconds have elapsed, the video content 6 needs to be further decoded for 0.5 second in order to display the video content 6 in a time period after 2 seconds and before 3 seconds have elapsed. Therefore, in order to decode the video content 3, the video content 4, the video content 5 and the video content 6 for a period of unit time, the resource of 3.5 seconds of the decoding processing unit 104 is allocated. Accordingly the extra amount of decoder is 0.75 at the time.

In view of FIG. 7, the rotation speed and the acceleration speed 2 seconds after starting the display are ⅛ and −⅛ respectively, and the graph of FIG. 4 is selected according to the formula 2. Accordingly, the "w" is 0.5 according to the formula 1 and FIG. 4. Thus, the extra amount of decoder, i.e., 0.75 is allocated. Namely, 0.375 is allocated to the video content 2 and the video content 7, respectively. More specifically, the video content 2 and the video content 7, respectively, is decoded for 0.375 second in a time period after 2 seconds and before 3 seconds have elapsed.

The decoded data of the video content 3, the video content 4, the video content 5 and the video content 6 in the display area are passed from the storage unit 105 to the video synthesis/display unit 106 immediately after the above decoded data are passed from the decoding processing unit 104 to the storage unit 105. In the video synthesis/display unit 106, the decoded data is subjected to the video synthesis processing and output from the video synthesis/display unit 106 to the display device. On the other hand, the decoded data of the video content 2 and the video content 7 in the hidden area are passed from the decoding processing unit 104 to the storage unit 105 and held in the storage unit 105 until the video content 2 and the video content 7 move to the display area.

Figure 11:
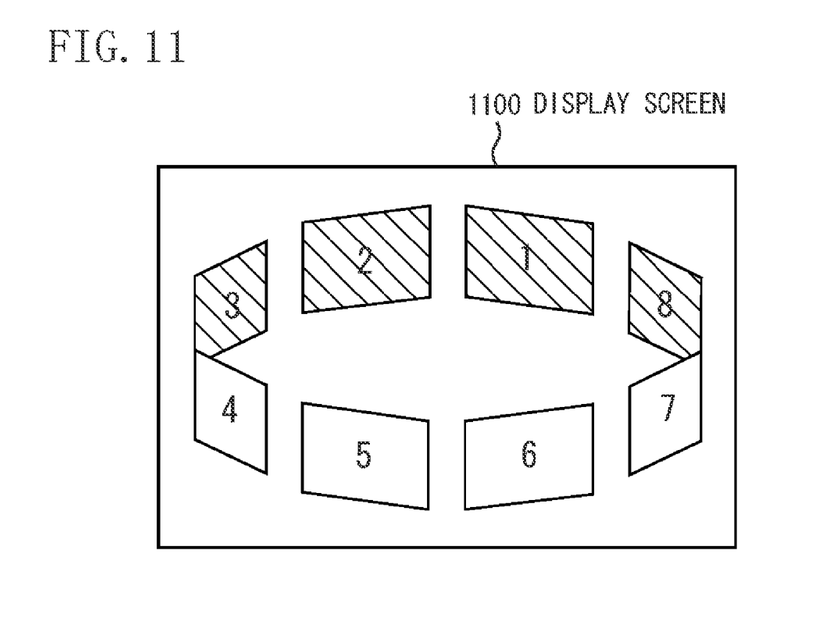
FIG. 11 illustrates a display state of a display screen 3 seconds after the video contents are displayed.

FIG. 11 illustrates a display state of a display screen 1100, 3 seconds after starting the display. An operation of the video display unit 1 in a time period after 3 seconds and before 4 seconds will have elapsed be described below.

The resource of the decoding processing unit 104 is preferentially allocated to the presently displayed screen (i.e., a video content 4, a video content 5, a video content 6 and a video content 7 of FIG. 11). Since the video content 7 has already been decoded for 0.375 second in a time period after 2 seconds and before 3 seconds have elapsed, the video content 7 needs to be further decoded for 0.625 second in order to display the video content 7 in a time period after 3 seconds and before 4 seconds have elapsed. Therefore, in order to decode the video content 4, the video content 5, the video content 6 and the video content 7 for the period of unit time, the resource of 3.625 seconds of the decoding processing unit 104 is allocated. The extra amount of decoder is 0.625 at the time.

Since the rotation speed and the acceleration speed 3 seconds after starting the display are 0 and −⅛ respectively in view of FIG. 7, the graph of FIG. 5 is selected according to the formula 2. Accordingly, the "w" is 0 according to the formula 1 and FIG. 5. Thus, the extra amount of decoder, i.e., 0.625, is allocated to the video content 3 of FIG. 11. The video content 3 is decoded for 0.625 second in a time period after 3 seconds and before 4 seconds have elapsed.

The decoded data of the video content 4, the video content 5, the video content 6 and the video content 7 in the display area are passed from the storage unit 105 to the video synthesis/display unit 106 immediately after the above decoded data are passed from the decoding processing unit 104 to the storage unit 105. In the video synthesis/display unit 106, the decoded data is subjected to the video synthesis processing, and thereafter output from the video synthesis/display unit 106 to the display device. On the other hand, the decoded data of the video content 3 in the hidden area is passed from the decoding processing unit 104 to the storage unit 105 and held in the storage unit 105 until the video content 3 moves to the display area.

Figure 12:
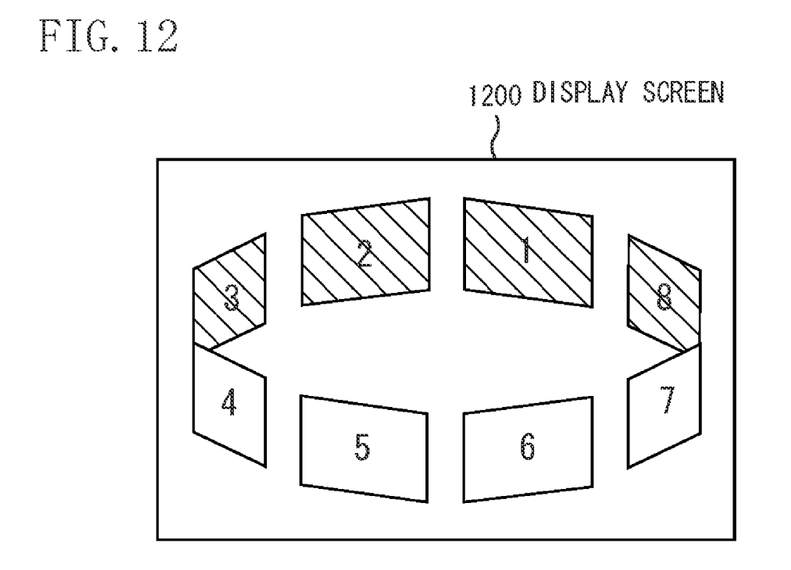
FIG. 12 illustrates a display state of a display screen 4 seconds after the video contents are displayed.

FIG. 12 illustrates a display state of a display screen 1200, 4 seconds after starting the display. An operation of the video display unit 1 in a time period after 4 seconds and before 5 seconds have elapsed is described below.

The resource of the decoding processing unit 104 is preferentially allocated to the presently displayed screen (i.e., a video content 4, a video content 5, a video content 6 and a video content 7 of FIG. 12). In order to decode these video contents for the period of unit time, the resource of 4 seconds of the decoding processing unit 104 is allocated to these video contents. Accordingly, the extra amount of decoder is 0.25 at the time.

Since the rotation speed and the acceleration speed 4 seconds after starting the display are −⅛ and 0 respectively, the graph of FIG. 5 is selected according to the formula 2. Accordingly, the "w" is 0 according to the formula 1 and FIG. 5. Thus, the extra amount of decoder, i.e., 0.25, is allocated to the video content 3 of FIG. 11. The video content 3 is decoded for 0.25 second in a time period after 4 seconds and before 5 seconds have elapsed. The video content 3 has already been decoded for 0.625 second in a period after 3 seconds and before 4 seconds have elapsed, which means that the video content 3 has been predecoded for a total 0.875 second.

The decoded data of the video content 4, the video content 5, the video content 6 and the video content 7 in the display area are passed from the storage unit 105 to the video synthesis/display unit 106 immediately after the above decoded data are passed from the decoding processing unit 104 to the storage unit 105. In the video synthesis/display unit 106, the decoded data is subjected to the video synthesis processing, and thereafter output from the video synthesis/display unit 106 to the display device. On the other hand, the decoded data of the video content 3 in the hidden area is passed from the decoding processing unit 104 to the storage unit 105, and held in the storage unit 105 until the video content 3 moves to the display area.

Figure 13:
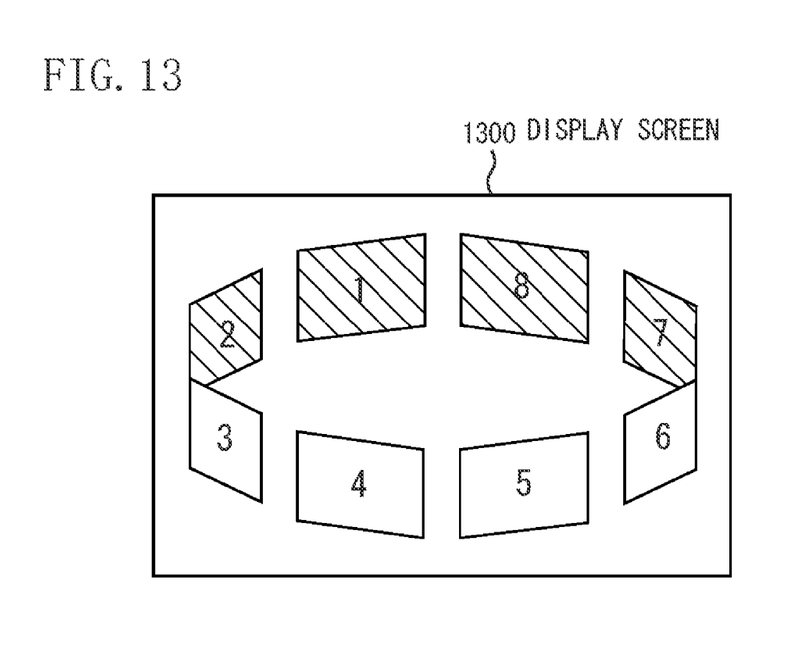
FIG. 13 illustrates a display state of a display screen 5 seconds after the display of the video contents.

FIG. 13 illustrates a display state of a display screen 1300, 5 seconds after starting the display. An operation of the video display unit 1 in a time period after 5 seconds and before 6 seconds have elapsed is described below.

The resource of the decoding processing unit 104 is preferentially allocated to the presently displayed screen (i.e., a video content 3, a video content 4, a video content 5 and a video content 6 of FIG. 13). The video content 3 has already been decoded for total 0.875 second in a time period after 3 seconds and before 4 seconds have elapsed and a time period after 4 seconds and before 5 seconds elapsed, which means that the video content 3 needs to be further decoded for 0.125 second in order to be displayed in a time period after 5 seconds and before 6 seconds have elapsed. Therefore, in order to decode the video content 3, the video content 4, the video content 5 and the video content 6 for the period of unit time, the resource of 3.125 seconds of the decoding processing unit 104 is allocated to the above video contents for. Accordingly, the extra amount of decoder is 1.125 at the time.

In view of FIG. 7, since the rotation speed and the acceleration speed are −⅛ and 0 respectively 5 seconds after starting the display, the graph of FIG. 5 is selected according to the formula 2. Accordingly, the "w" is 0 according to the formula 1 and FIG. 5. Thus, the extra amount of decoder, i.e., 1.125, is allocated to the video content 2 and the video content 1 of FIG. 13. The video content 2 has already been decoded for 0.375 second in a time period after 2 seconds and before 3 seconds have elapsed, which means that 0.625 of the extra amount of decoder is further allocated to the video content 2, and thus the video content 2 is decoded for 0.625 second. The remaining 0.5 of the extra amount of decoder is allocated to the video content 1 and thus is decoded for 0.5 second.

The decoded data of the video content 3, the video content 4, the video content 5 and the video content 6 in the display area are passed from the storage unit 105 to the video synthesis/display unit 106 immediately after the above decoded data are passed from the decoding processing unit 104 to the storage unit 105. In the video synthesis/display unit 106, the decode data is subjected to the video synthesis processing and output from the video synthesis/display unit 106 to the display device. On the other hand, the decoded data of the video content 2 and the video content 1 in the hidden area are passed from the decoding processing unit 104 to the storage unit 105 and held in the storage unit 105 until the video content 2 and the video content 1 move to the display area.

Figure 14:
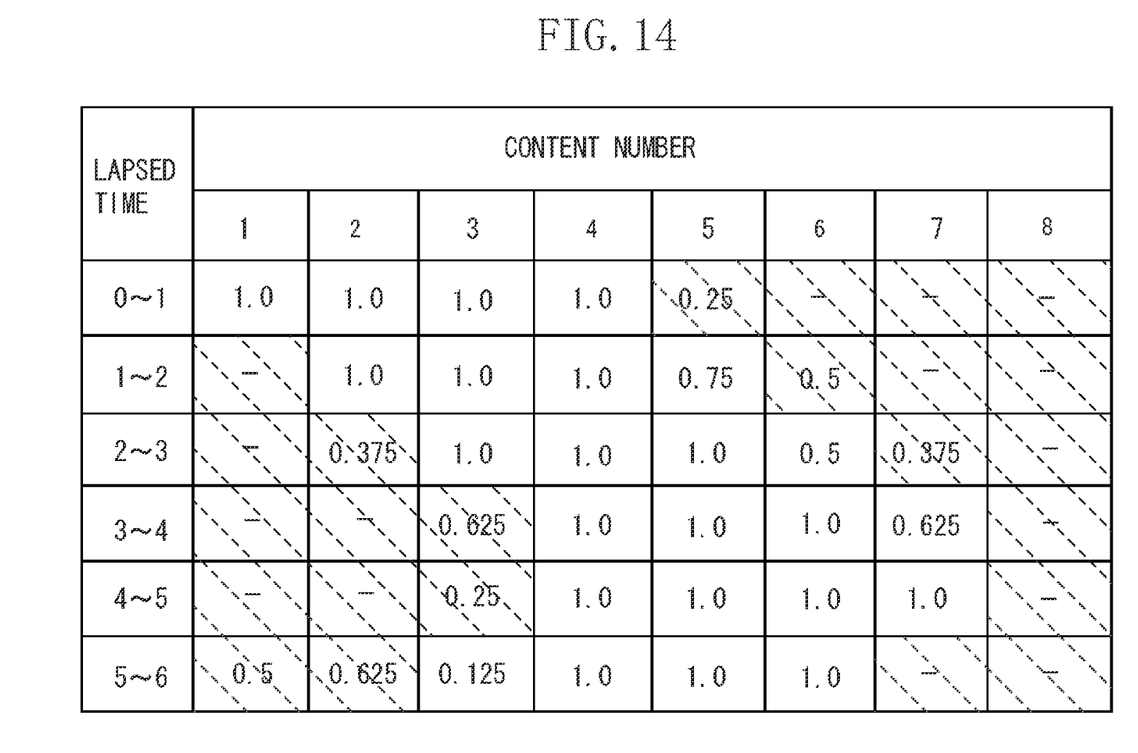
FIG. 14 illustrates an allocation of a decoder with respect to each of the video contents after 0 second to 6 seconds have elapsed.

Allocation of decoder with respect to each of the video contents in a time period after starting the display and before 6 seconds has elapsed was described above. FIG. 14 illustrates the allocation of decoder with respect to each of the video contents in a time period after 0 second and before 6 seconds have elapsed. Sections with white background in a table of FIG. 14 represent that the contents of the sections are displayed at the moment, whereas the hatched sections represent that the contents of the sections are hidden at the moment.

As described above, in the present exemplary embodiment, the video content which moves from the hidden area to the display area is predicted according to the conditions of scroll display control of the plurality of video contents, and the predicted video content is decoded before the video content moves to the display area. Therefore, according to the present exemplary embodiment, the video content which has a high possibility to be displayed next is predicted according to the conditions of scroll display control and can be subjected to the decoding processing before the video content is displayed. Thus, the video content can be displayed without a delay which maybe caused by the decoding processing, when the video content moves from the hidden area to the display area.

In the present exemplary embodiment, only the display of the contents arranged into the annular ring shape is described. However, the present invention is also applicable to a display of the contents arranged into any form as far as the display is scrolled.

The present invention is applicable to a part of a system including a plurality of devices, or is also applicable to a part of a single device.

Further, the present invention is not limited to the apparatus or the method for realizing the above described exemplary embodiment.

For example, the above system or the apparatus including a computer (a central processing unit (CPU) or a micro processing unit (MPU)) to which a software program code is supplied in order to realize the above described exemplary embodiment is also encompassed within the spirit of the present invention. Further, the system or the apparatus including the computer which operates each of the above described various devices according to the program code in order to realize the above described exemplary embodiment is also encompassed within the spirit of the present invention.

In this case, the program code itself of the software realizes the function of the above described exemplary embodiment . In other words, the program code itself and a means for supplying the program code to the computer, more specifically, a storage medium which stores the program code are also encompassed within the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a memory;

a processor coupled to the memory which executes the following:
displaying a plurality of images in a display area by scroll display;
determining, based on a direction of scrolling being performed, a plurality of different decoding resources for different images which are not being displayed in the display area; and
decoding an image for display in accordance with the determined decoding resources.

2. The image processing apparatus according to claim 1, further comprising determining, based on the direction of scrolling, each amount of the plurality of different decoding resources, wherein
in the decoding, the image is decoded for display in accordance with the determined amount of decoding resources.

3. The image processing apparatus according to claim 1, wherein in the determining, the plurality of different decoding resources is determined based on the direction of scrolling and acceleration of scrolling being performed.

4. The image processing apparatus according to claim 1, wherein
in the determining, the plurality of different decoding resources is determined based on the direction of scrolling and a speed of scrolling being performed.

5. The image processing apparatus according to claim 1, wherein the processor further executes
calculating a prospective speed of scrolling, wherein
in the determining, the plurality of different decoding resources is determined based on the calculated prospective speed of scrolling.

6. The image processing apparatus according to claim 1, wherein
the decoding resources to be determined corresponds to a time period of decoding processing.

7. The image processing apparatus according to claim 1, wherein each of the plurality of images is a video content.

8. An image processing method for an image processing apparatus comprising:
displaying a plurality of images in a display area by scroll display;
determining, based on a direction of scrolling being performed, a plurality of different decoding resources for different images which are not being displayed in the display area; and
decoding an image for display in accordance with the determined decoding resources.

9. The image processing method according to claim 8, wherein in the determining, the plurality of different decoding resources is determined based on the direction of scrolling and acceleration of scrolling being performed.

10. A non-transitory computer readable storage medium containing computer-executable instructions that execute an image processing method for an image processing apparatus, the method comprising:
displaying a plurality of images in a display area by scroll display;
determining, based on a direction of scrolling being performed, a plurality of different decoding resources for different images which are not being displayed in the display area; and
decoding an image for display in accordance with the determined decoding resources.

11. An image processing apparatus comprising:
a memory;
a processor coupled to the memory which executes the following:
displaying a plurality of pieces of content data by scroll display;
predicting content data which is to be displayed in a display area among non-displayed content data of the plurality of pieces of content data that is not displayed in the display area;
determining, if scrolling is decelerated, to allocate decoding resources to both first non-displayed content data which is in a scrolling direction from a position of content data being displayed and second non-displayed content data which is in the opposite direction of the scrolling direction from the position; and
decoding the predicted content data based on allocated decoding resources.

12. The image processing apparatus according to claim 11, further comprising determining, if scrolling is accelerated, to allocate higher amount of decoding resources to the first non-displayed content data than an amount of decoding resources allocated to the second non-displayed content data.

13. The image processing apparatus according to claim 11, further comprising determining, if a scrolling speed is constant, to allocate corresponding amount of decoding resources to both the first non-displayed content data and the second non-displayed content data.

14. The image processing apparatus according to claim 11, wherein in the predicting, the content data which is to be displayed in the display area, is predicted based on a scrolling speed and a speed of acceleration of scrolling.

15. An image processing method for an image processing apparatus comprising:
displaying a plurality of pieces of content data by scroll display;
predicting content data which is to be displayed in a display area among non-displayed content data of the plurality of pieces of content data that is not displayed in the display area;
determining, if scrolling is decelerated, to allocate decoding resources to both first non-displayed content data which is in a scrolling direction from a position of content data being displayed and second non-displayed content data which is in the opposite direction of the scrolling direction from the position; and
decoding the predicted content data based on allocated decoding resources according to the determining.

16. A non-transitory computer readable storage medium containing computer-executable instructions that execute an image processing method for an image processing apparatus, the method comprising:
displaying a plurality of pieces of content data by scroll display;
predicting content data which is to be displayed in a display area among non-displayed content data of the plurality of pieces of content data that is not displayed in the display area;
determining, if scrolling is decelerated, to allocate decoding resources to both first non-displayed content data which is in a scrolling direction from a position of content data being displayed and second non-displayed content data which is in the opposite direction of the scrolling direction from the position; and
decoding the predicted content data based on allocated decoding resources according to the determining.

* * * * *